(12) United States Patent
Vedantam

(10) Patent No.: US 10,098,432 B2
(45) Date of Patent: Oct. 16, 2018

(54) SYSTEM AND METHOD FOR TRACKING BAGGAGE

(71) Applicant: Soma Sekhar Vedantam, Hyderabad (IN)

(72) Inventor: Soma Sekhar Vedantam, Hyderabad (IN)

(73) Assignee: SOMA SEKHAR VEDANTAM, Hyderabad (IN)

( * ) Notice: Subject to any disclaimer, the term of this patent is extended or adjusted under 35 U.S.C. 154(b) by 0 days.

(21) Appl. No.: 15/647,770

(22) Filed: Jul. 12, 2017

(65) Prior Publication Data
US 2018/0014616 A1 Jan. 18, 2018

(51) Int. Cl.
G08B 1/08 (2006.01)
A45C 13/42 (2006.01)
G06Q 10/08 (2012.01)
A45C 13/18 (2006.01)
G06F 17/30 (2006.01)
G06Q 50/30 (2012.01)
G06K 7/10 (2006.01)

(52) U.S. Cl.
CPC .............. *A45C 13/42* (2013.01); *A45C 13/18* (2013.01); *G06F 17/30* (2013.01); *G06K 7/10445* (2013.01); *G06Q 10/0833* (2013.01); *G06Q 50/30* (2013.01)

(58) Field of Classification Search
CPC combination set(s) only.
See application file for complete search history.

(56) References Cited

U.S. PATENT DOCUMENTS

| 7,522,053 B2 * | 4/2009 | Johnson | B64F 1/368 340/572.1 |
| 2007/0109127 A1 * | 5/2007 | Johnson | B64F 1/368 340/572.1 |

* cited by examiner

*Primary Examiner* — Travis Hunnings
(74) *Attorney, Agent, or Firm* — Barry Choobin; Patent 360 LLC

(57) ABSTRACT

A system and method for tracking baggage, and identifying baggage having suspicious contents is disclosed. The system includes a baggage handling module, an alert generation module, and a baggage tracking equipment. The baggage handling module scans each baggage and generates a corresponding baggage ID and a baggage image. The baggage handling module identifies at least some of the scanned baggage as being suspicious, subsequent to scanning, and a radio frequency identification (RFID) tag is attached onto the suspicious baggage. A RFID reader scans each baggage to determine the presence of RFID tag, and consequently instructs the alert generation module to generate an alert message notifying the presence of a suspicious baggage.

10 Claims, 2 Drawing Sheets

SYSTEM AND METHOD FOR TRACKING BAGGAGE

CROSS-REFERENCE TO RELATED APPLICATION

The embodiments herein claims the priority of the Indian Provisional Patent Application with the serial number 201641023990 filed on Jul. 1, 2016 with the title, "A SYSTEM AND METHOD FOR TRACKING SUSPECT BAGGAGE USING RFID, SENSORS AND IOT", and the contents of which is included entirely as reference herein.

TECHNICAL FIELD

The present disclosure is generally related to baggage tracking. The present disclosure is more particularly related to tracking suspicious baggage.

BACKGROUND

Radio-frequency identification (RFID) uses electromagnetic fields to automatically identify and track the objects to having RFID tags attached thereto. The RFID tags contain electronically stored information. RFID tags are used in many industries, including but not limited to the automobile industry, the pharmaceutical industry, food industry, aviation industry, education, livestock maintenance and the like. Each of the RFID tags incorporate an ID that communicates with a networked system to enable tracking of the objects to which they (RFID tags) are attached.

Security check is a prime concern in travel terminals, malls, public gatherings and the like. Security check process includes determining the presence of contraband materials in baggages and identifying people/objects that may cause threat. In an example, airports employ a scanning process to examine each baggage for the presence of contraband materials. Examples of contraband materials include pirated CDs, drugs, weapons, explosives, narcotic substances and the like. Based on the screening process, the baggage is identified as either a suspicious baggage or a legitimate (non-suspicious) baggage. Further, the security personnel are notified about the identification of suspicious baggage. In the aforementioned scenario, the onus is entirely on the security personnel to track the suspicious baggage. Furthermore, there is no provision for real-time, tracking of the suspicious baggage. Even though airports, railway stations and bus stations employ sniffer dogs inter-glia as a security procedure to identify suspicious baggage, such security procedures are not automated, and comparatively easy to evade.

In view of the foregoing, there exists a need for a system that can be attached to baggage without intimating the passenger that he/she is being tracked. Furthermore, there is a need for a system and method for identification and tracking a suspicious baggage using RFID tags.

OBJECTS

The embodiments of the present disclosure provide a system and method for tracking suspicious baggage using RF ID tags.

The primary object of the present disclosure is to identify and track suspicious baggages.

Another object of the present disclosure is to provide information regarding the location of the suspicious baggage in real-time.

Yet another object of the present disclosure is to provide a method to rack suspicious baggage without requiring a line of sight access.

Yet another object of the present disclosure is to provide a system and method that generates one, of an alarm, notification in response to the detection of an RFID tag an a baggage.

Yet another object of the present disclosure is to provide system and method having a high degree of security and product authentication by providing a RFID tag.

Yet another object of the present disclosure is to provide a system that implements Bluetooth Low Energy (BLE) sensors capable of screening BLE tagged bags and bags with E-TAGs.

Yet another object of the present disclosure is to eliminate the use of sniffer dogs and security personnel in identifying suspect baggage, with adoption of sensor based identification.

Yet another object of the present disclosure is to minimize the onus and responsibility the security personnel in identifying and tracking suspect baggage.

These and other objects and advantages of the present disclosure will become readily apparent from the following detailed description read in conjunction with the accompanying drawings.

SUMMARY

The various embodiments of the present disclosure provide a method and system for tracking baggage using RFID tags. The system for suspect baggage tracking and notification includes a Baggage Handling Module, an alerting module, a RF ID tag, a display module, and a camera. The baggage handling, module is configured to generate, a baggage identifier (ID) for each baggage. Further, for any baggage identified as being suspicious by the baggage handling module, programmable radio frequency identification (RFID) tag is attached. The RFID tag is programmed with a unique identifier and at least a baggage ID (allocated to the baggage while being scanned by the baggage handling module). The system further includes a RFID reader that is configured to scan each of the baggage to determine the presence of the RFID tag thereupon. On confirming the presence of the RFID tag on a baggage, the reader instructs an alert generation module to generate at least one notification indicating the presence of the suspicious baggage. The notification includes at least one of an alarm, a voice-based alert message, a video based alert message and a text-based alert message.

The present disclosure further envisages a method for tracking suspicious baggage. Firstly, a baggage is scanned and a baggage identifier (BHS ID) is accorded to the scanned baggage. Furthermore, an image of the scanned baggage is also generated. During the scanning procedure, if a baggage is identified as a suspicious baggage, a programmable RFID tag is attached thereto. The RFID tag is programmed to incorporate at least an RFID identifier and the baggage identifier (BHS ID) corresponding, to the baggage. Further, each baggage is rescanned to identify the presence of RFID tag thereupon. On confirming the presence of RFID tag on a baggage, the alert generation module is instructed to genera e a notification and subsequently transmit the notification to security authorities. The notification generated by the alert generation module, includes at least one of an alarm, a voice-based alert message, a video based alert message and a text-based alert message.

These and other aspects of the embodiments herein will be better appreciated and understood when considered in conjunction with the following description and the accompanying drawings. It should be understood, however, that the following descriptions, while indicating the preferred embodiments and numerous specific details thereof are given by way of an illustration and not of a limitation.

BRIEF DESCRIPTION OF THE DRAWINGS

The other objects, features, and advantages will occur to those skilled in the art from the following description of the preferred embodiment and the accompanying drawings in which.

Although the specific features of the present disclosure are shown in some drawings and not in others, this is done only for convenience as each feature may be combined with any or all of the other features in accordance with the present disclosure.

DETAILED DESCRIPTION

In the following detailed description, a reference is made to the accompanying drawings that form a part hereof, and in which the specific embodiments that may be practiced are shown by way of illustration. These embodiments are described in sufficient detail to enable those skilled in the art to practice them, and it is to be understood that the logical, mechanical and other changes may be made without departing from the scope of the embodiments.

Figure 1:
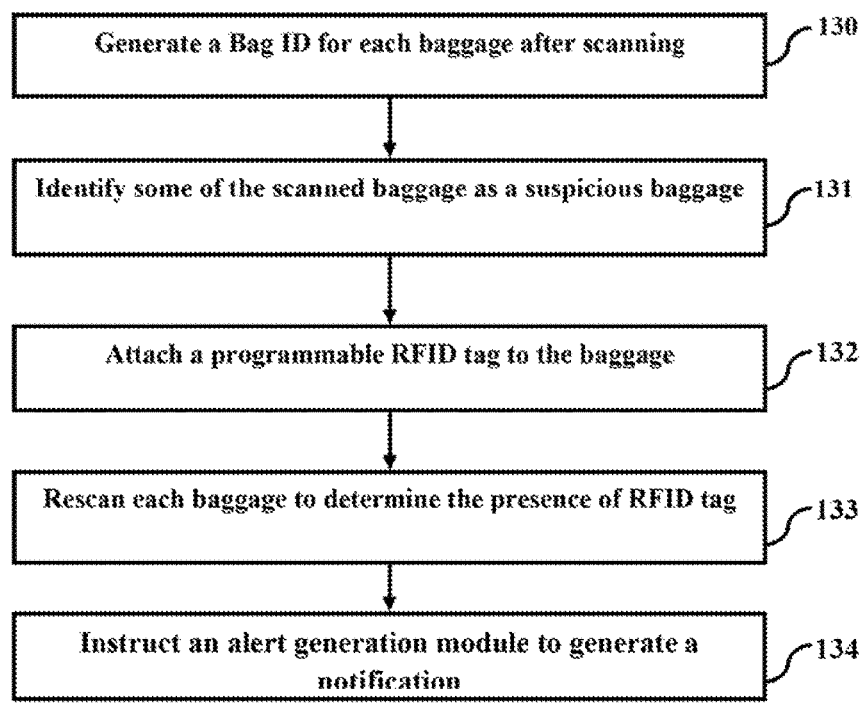
FIG. 1 is a flowchart illustrating a method for tracking baggage and identifying suspicious baggage, in accordance with the present disclosure.

FIG. 1 illustrates a flowchart explaining a method for identifying a suspicious baggage in airports. The method, in particular, illustrates the steps involved in identifying suspicious baggage at, for example, airports, using RFID tags. In accordance with the present disclosure, the baggage of the passengers are screened and checked for the presence of suspicious packages and a baggage handling module (BHS) generates an identification number (BHS ID) also known as baggage ID for each of the checked screened baggage (Step 130). Further, the baggage handling module generates an X-ray image of the baggage (referred to as baggage image hereafter). Subsequently, the baggage image and the corresponding baggage ID are interlinked while being stored in a repository.

In accordance with the present disclosure, at least some of the scanned baggage are identified as being suspicious at least partially based on the contents stored therein, and further the identified baggage is categorized as suspicious baggage (Step 131). In an example, the step of screening/checking the baggage for the presence of suspicious substances is performed manually. Alternatively, the baggage is screened/checked using well-known X-ray baggage scanners, CT scanners or any other suitable baggage scanning apparatus. In addition to the scanning/checking of the baggage, it is preferable that baggage is also screened based on a set of predetermined parameters including but not restricted to construction of baggage, travel path of the baggage owner and background of the baggage owner.

If the baggage is identified as being suspicious, a programmable RFID tag is attached to the suspicious baggage (Step 132). The RFID tag is programmed to incorporate a unique identifier field and a variable field. Preferably, the baggage ID and the baggage image are programmed into the variable field of the RFID tag being attached to the suspicious baggage.

In accordance with the present disclosure, the repository, in addition to storing the baggage ID and baggage image (corresponding to the each of the baggage), also stores the unique identifier identifying the RFID tags affixed onto each of the baggage, and location of the baggage at which the RFID tag is affixed. Preferably, the baggage with no RFID tags is deemed as legitimate (non-suspicious). Preferably, the RFID tags are manually attached each of the baggage determined as being suspicious. Alternatively, the baggage scanning machine attaches an RFID tag to a baggage determined as being suspicious post the scanning procedure.

Subsequently, the baggage is rescanned (for example, at an exit terminus of the airport) using an RFID reader for detecting the presence of the RFID tag (Step 133). The RFID reader triggers an alert generation module in the event of detecting the presence of an RFID tag, thereby instructing the alert generation module to generate an alert (for example, an audio alarm, voice message, SMS alert) notifying the presence of the RFID tag (Step 134). The security establishment (for example, airport security personnel, and customs department personnel) is alerted, via the alert generation module, when an RFID tag is detected affixed onto a particular baggage.

Figure 2:
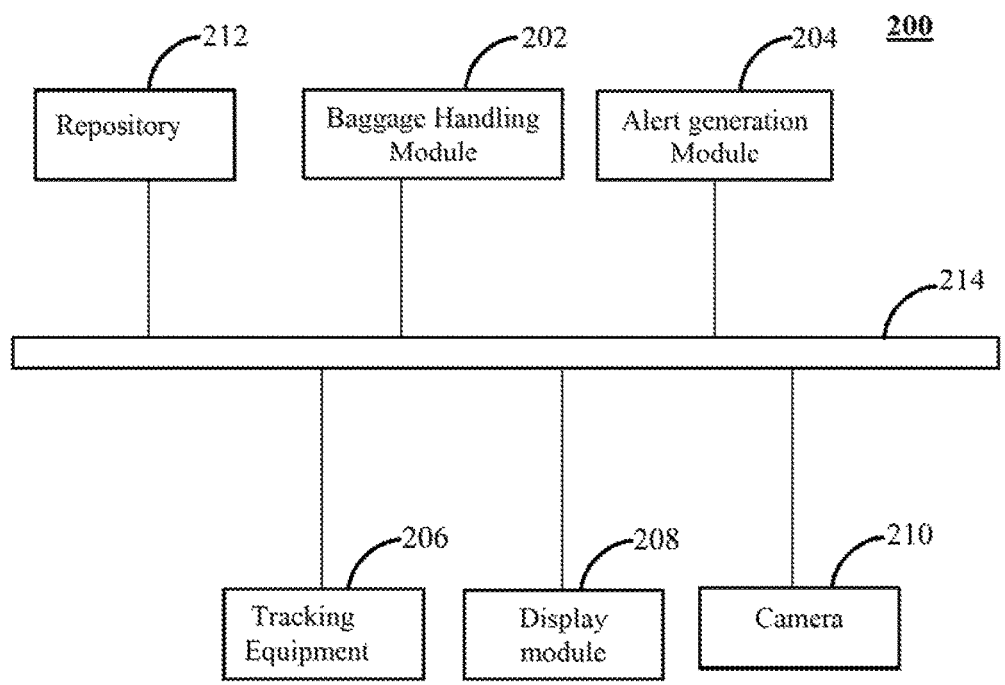
FIG. 2 is a block diagram illustrating a baggage tracking and suspicious baggage identification system, in accordance with the present disclosure.

FIG. 2 illustrates a system 200 for tracking baggage and identifying baggage incorporating suspicious material therein (for example, contraband substances, explosive materials and the like). The system 200 includes a baggage handling module 202, an alert generation module 204, and a baggage tracking equipment 206.

Preferably, the operations of the baggage handling module 202 are preferably controlled by a microcontroller (not shown in figures). Typically, the baggage handling module 202 is communicably coupled to a display enabled computing device (not shown in figures). The examples of the computing device include, but are not limited to a desktop computer, and an industrial monitor. The baggage handling module 202 is configured to scan each baggage and generate an image (preferably, an X-ray image) of the scanned baggage. Further, the baggage handling module 202 assigns a unique baggage identifier (baggage ID) for each of the scanned baggage. Further, the baggage handling module 202, based on an analysis of the corresponding x-ray image, ascertains whether a scanned baggage is incorporating any prohibited substances/elements (for example, explosive material, contraband substance, and weaponry).

In accordance with an exemplary embodiment of the present disclosure, the baggage handling module 202 also displays the X-ray images corresponding to the scanned baggages, on the display enabled computing device communicably coupled thereto, and prompts a user of the computer device (preferably a computer operator, or a member of the security establishment) to reaffirm the baggage as carrying prohibited substances/elements. Finally, post analysis of the corresponding x-ray image and after the affirmation from the user of the computing device that the baggage incorporates prohibited substances, the baggage handling module 202 categorizes the said baggage as a suspicious baggage.

In accordance with the disclosure, the tracking equipment 206 used for tracking suspicious baggage is a combination of a Programmable Radio Frequency Identification (RFID) tag, and an RFID reader. The RFID tag (not shoe m in figures) is attached to a baggage determined as being suspicious by the baggage handling module 202. The RFID tags typically incorporate a unique identifier field (RFID identifier), and a programmable variable field. Preferably, the variable field of an RFID tag is programmed with the baggage ID and the baggage image corresponding to the baggage, both generated by the baggage handling module 202.

In accordance with the present disclosure, an RFID reader (not shown in figures) is used to screen each of the baggage for the presence of RFID tags. Preferably, the baggage handling module 202 is situated at a first location (for example, at the departure terminal of the airport), while the RFID reader is situated at a second location (for example, the boarding lounge of the airport). Typically, the RFID reader is configured to detect the electronic signals emanating from an antenna of the RFID tag. Typically, the RFID reader identifies an RFID tag based on the corresponding unique RFID identifier and reads at least the baggage ID and the baggage image programmed into the (variable field of the) said RFID tag.

Preferably, the RFID reader is integrated into a mobile computer having data communication capabilities. Subsequent to the detection of an RFID tag on a baggage, the RFID reader triggers the alert generation module 204, which in turn generates a notification preferably alerting the security establishment about the presence of a baggage carrying prohibited substances/elements (suspicious baggage). Subsequently, the RFID reader also transmits the RFID identifier, baggage ID and the baggage image corresponding to the suspicious baggage, to a repository 212.

The alert generation module 204 generates a notification and preferably transmits the notification to security authorities whenever an RFID tag is detected to be attached to a baggage. The notification generated by the alert generation module 204 includes at least one of an alarm, a voice-based alert message, a video based alert message and a text-based alert message.

In accordance with the present disclosure, the repository 212 stores the RFID identifier corresponding to each of the RFID tags. Further, the repository 212 also stores baggage ID and baggage image pertinent to every baggage onto which the RFID tag was attached. The information stored in repository 212 is utilized to positively identify a suspect baggage. Further, the repository 212 is configured to store personal information corresponding to the traveler/user identified as the person carrying the suspicious baggage. The personal details stored in the repository 212 include but me not restricted to traveler name, traveler nationality, traveler's point of boarding, traveler passport number, video clipping capturing the movement of the traveler carrying the suspicious baggage, and flight information corresponding to the traveler.

The system 200 further includes a display module 208 and a camera 210. The camera 210 continuously captures the movement of the passengers including that of the people carrying baggage deemed as suspicious by the baggage handling module 202. Further, the movement of the passengers, as captured by the camera 210 is preferably, rendered viewable on the display module 208.

In accordance with the disclosure, the baggage handling module 202, the alert generation module 204, the baggage tracking equipment 206, the camera 210, the display module 208, and the repository 212 are communicably coupled with one another through a communication network 214. The examples of the communication network include, but are not limited to the internet, intranet, a wired network, a radio-frequency network, local area network (LAN), wide area network (WAN), a metro area network (MAN), and telecommunication network.

TECHNICAL ADVANTAGES

The present disclosure envisages a method and system for identifying and tagging suspicious baggage. The system envisaged by the present disclosure automates the baggage scanning processes and assists the security personnel in achieving improved better productivity in handling baggage handling activities. Further, the present disclosure provides an automated system for continuously tracking passenger baggage within a specific perimeter (for example, within an airport).

The system envisaged by the present disclosure provides visible and accurate information regarding baggage deemed as suspicious, in real-time. The system enables tracking the suspect baggage without mandating a line of sight access and with minimal human intelligence and human intervention.

The system could be seamlessly integrated with the existing baggage handling modules, and the existing infrastructure could be easily synchronized to accommodate the RFID-based baggage tracking system envisaged by the present disclosure. Further, the system has the ability to be, scaled by using sensor tunnels. A plurality of sensor tunnels is connected to the communication network which is monitored continuously at a central area. The sensor network provides automatically populating a huge database which enables the concerned authority to enhance the security mechanism.

Further, the system enables creation of a passenger information system incorporating the personal information of passengers carrying suspicious baggage, including passenger passport number, passenger name, passenger nationality, baggage image number, type and nature of baggage, details of airports traveled through, and travel time stamp. The passenger information system is preferably transformed into a data warehouse storing suspect passenger information elicited from across the world, which could be mined to retrieve the relevant suspect person information. The passenger information system could be used, for example, to forewarn the airline service providers, before a passenger carrying a suspicious baggage) boards an aircraft or exits the transport terminal.

Further, the system envisaged by the present disclosure enables security authorities to execute predictive analytics in respect of the movement of banned/harmful packages, rationalization of security resources deployment and perceived security threats. The predictive analysis performed by the suspect baggage identification system helps security authorities to optimize the security related resources and provide a forewarning to concerned authorities regarding the presence/movement of passengers carrying, suspicious baggage. The information embodied on the RFID tags used in the present disclosure is secured and resistant to counterfeiting.

In accordance with the disclosure, the system provides efficient performance, ease of use, ease of installation, and aesthetics. Further, the present disclosure provides a system that is embedded with standalone RFID equipment and is designed to read from the RFID regardless of the tag orientation. The system envisaged by the present disclosure is typically implemented using a combination of sensors including at least one of Bluetooth Low Energy (BLE) sensors, biosensors, and radioactive sensors inter-alia. The sensors provide for the suspicious baggage to be screened in an unobtrusive manner. Further, the system envisaged by the present disclosure is capable of screening Bluetooth Low Energy (BLE) tagged bags and bags with E-TAGs.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A system for tracking, baggage, said system comprising:
    a baggage handling module configured to scan the baggage and generate a baggage identifier (ID) uniquely identifying each of scanned baggage, said baggage handling module further configured to selectively identify at least some of the scanned baggage as being suspicious, and categorize identified baggage as suspicious baggage, said baggage handling module still further configured to generate at least one baggage image describing contents of each of the suspicious baggage;
    a radio frequency identification (RFID) tag configured to be selectively attached to the suspicious baggage, said RFID tag configured to incorporate at least an RFID identifier and the baggage ID of the suspicious baggage;
    a RFID reader configured to scan each of the baggage and determine whether the RFID tag has been attached thereto, said RFID reader further configured to affirm each of the baggage having the RFID attached thereto as the suspicious baggage and read from the RFID tag at least the RFID identifier and the baggage ID, said RFID reader further configured to instruct an alert generation module to generate at least one notification indicating presence of the suspicious baggage.

2. The system as claimed in claim 1, wherein the alert generation module is further configured to generate a notification in response to the instruction from the RFID reader, said notification comprising at least one of an alarm, voice message, a video alert message, and a text-based alert message.

3. The system as claimed in claim 1, wherein said baggage handling module is further configured to selectively identify at least some of the scanned baggage as suspicious, subsequent to scanning the contents of the baggage using at least one of x-rays, gamma rays and thermal neutrons.

4. The system as claimed in claim 1, wherein said RFID tag is further configured to incorporate the baggage image describing the contents of the suspicious baggage to which the RFID tag is attached.

5. The system as claimed in claim 1, wherein said system further comprises a repository configured to store at least the RFID identifier, the baggage ID and the baggage image corresponding to each of the suspicions baggage.

6. A method for tracking baggage, said method comprising the following steps:
    scanning each baggage and generating baggage identifier (ID) for each of scanned baggage;
    generating at least one baggage image describing contents of each of the scanned baggage;
    selectively identifying at least one of the scanned baggage as being suspicious, and categorizing identified scanned baggage as suspicious baggage;
    attaching a programmable RFID tag onto the suspicious baggage, and programming said RFID tag to incorporate at least RFID identifier and the baggage ID corresponding to the suspicious baggage;
    rescanning each of the baggage and determining whether the RFID tag has been attached thereto;
    affirming each of the baggage having the RFID tag attached thereto as the suspicious baggage and reading from the RFID tag attached thereto, at least the RFID identifier and baggage ID; and
    instructing an alert generation module to generate at least ore notification indicating the presence of the suspicious baggage.

7. The method as claimed in claim 6, wherein the step of generating at least one notification further comprises the step of generating a not selected from the group consisting of an alarm, a voice message, a video alert message, and a text-based alert message.

8. The method as claimed in claim 6, wherein the step of identifying at least some of the scanned baggage as being suspicious, further includes the step of identifying at least some of the scanned baggage as being suspicious, based on an analysis and inspection of contents of each of the baggage.

9. The method as claimed in claim 6, wherein the step of programming the RFID tag farther includes the step of programming the RFID tag to incorporate a baggage image corresponding to the suspicious baggage.

10. The method as claimed in claim 6, wherein the method further includes the step of storing the RFID identifier, the baggage identifier and baggage image corresponding to the suspicious baggage, in a repository.

* * * * *